United States Patent
Ding et al.

(10) Patent No.: US 12,106,664 B2
(45) Date of Patent: Oct. 1, 2024

(54) DYNAMIC ROAD TRAFFIC NOISE MAPPING USING DISTRIBUTED FIBER OPTIC SENSING (DFOS) OVER TELECOM NETWORK

(71) Applicant: NEC Laboratories America, Inc., Princeton, NJ (US)

(72) Inventors: Yangmin Ding, East Brunswick, NJ (US); Yue Tian, Princeton, NJ (US); Sarper Ozharar, Pennington, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 191 days.

(21) Appl. No.: 17/968,265

(22) Filed: Oct. 18, 2022

(65) Prior Publication Data
US 2023/0125456 A1 Apr. 27, 2023

Related U.S. Application Data

(60) Provisional application No. 63/270,645, filed on Oct. 22, 2021.

(51) Int. Cl.
| | |
|---|---|
| *G08G 1/04* | (2006.01) |
| *G01V 1/00* | (2024.01) |
| *G01V 1/22* | (2006.01) |
| *G01V 1/30* | (2006.01) |
| *G08G 1/01* | (2006.01) |

(52) U.S. Cl.
CPC .............. *G08G 1/04* (2013.01); *G01V 1/001* (2013.01); *G01V 1/226* (2013.01); *G01V 1/30* (2013.01); *G08G 1/0104* (2013.01)

(58) Field of Classification Search
CPC ........ G08G 1/04; G08G 1/0104; G01V 1/001; G01V 1/226; G01V 1/30
See application file for complete search history.

(56) References Cited

U.S. PATENT DOCUMENTS

| | | | |
|---|---|---|---|
| 7,024,064 B2 * | 4/2006 | Hill | G08G 1/02 385/12 |
| 7,042,369 B2 * | 5/2006 | Hill | E01F 11/00 340/936 |

(Continued)

FOREIGN PATENT DOCUMENTS

| | | | | |
|---|---|---|---|---|
| WO | WO-2022061422 A1 * | 3/2022 | ......... | G01C 21/3807 |
| WO | WO-2024059103 A1 * | 3/2024 | ......... | G01D 5/35361 |

*Primary Examiner* — Hoi C Lau
(74) *Attorney, Agent, or Firm* — Joseph Kolodka (57) ABSTRACT

Aspects of the present disclosure describe dynamic road traffic noise mapping using DFOS over a telecommunications network that enables mapping of road traffic-induced noise at any observer location. DFOS is used to obtain instant traffic data including vehicle speed, volume, and vehicle types, based on vibration and acoustic signal along the length of a sensing fiber along with location information. A sound pressure level at a point of interest is determined, and traffic data associated with such point is incorporated into a reference noise emission database and a wave propagation theory for total sound pressure level prediction and mapping. Real-time wind speed using DFOS—such as distributed acoustic sensing (DAS)—is obtained to provide sound pressure adjustment due to the wind speed.

10 Claims, 8 Drawing Sheets

(56) References Cited

U.S. PATENT DOCUMENTS

| | | | | |
|---|---|---|---|---|
| 7,068,186 | B2* | 6/2006 | Hill | E01F 11/00 |
| | | | | 398/151 |
| 10,431,077 | B2* | 10/2019 | Martin | G08G 1/07 |
| 11,276,302 | B2* | 3/2022 | Narisetty | G08G 1/02 |
| 2004/0061628 | A1* | 4/2004 | Hill | G08G 1/02 |
| | | | | 340/933 |
| 2004/0067004 | A1* | 4/2004 | Hill | G08G 1/04 |
| | | | | 356/478 |
| 2004/0080432 | A1* | 4/2004 | Hill | E01F 11/00 |
| | | | | 340/942 |
| 2008/0294331 | A1* | 11/2008 | Fushiki | G08G 1/096827 |
| | | | | 701/119 |
| 2016/0286627 | A1* | 9/2016 | Chen | H05B 47/175 |
| 2016/0286629 | A1* | 9/2016 | Chen | H05B 47/19 |
| 2018/0342156 | A1* | 11/2018 | Martin | G08G 1/052 |
| 2020/0319018 | A1* | 10/2020 | Huang | H04W 4/70 |
| 2021/0241615 | A1* | 8/2021 | Narisetty | G08G 1/02 |
| 2022/0228948 | A1* | 7/2022 | Huang | H04B 10/071 |
| 2023/0027287 | A1* | 1/2023 | Huang | G01D 5/35361 |
| 2023/0125456 | A1* | 4/2023 | Ding | G01H 9/004 |
| | | | | 340/933 |
| 2023/0358562 | A1* | 11/2023 | Englund | G01C 21/3833 |
| 2023/0375398 | A1* | 11/2023 | Hu | H04B 10/2507 |
| 2023/0400350 | A1* | 12/2023 | Han | G01D 5/35358 |

* cited by examiner

FIG. 1

Prior Art

| Vehicle type | Description |
|---|---|
| Automobiles | All vehicles with two axles and four tires-generally with gross vehicle weight less than 9,900 lb |
| Medium trucks | All cargo vehicles with two axles and six tires-generally with gross vehicle weight between 9,900 lb and 26,400 lb. |
| Heavy trucks | All cargo vehicles with three or more axles-generally with gross vehicle weight more than 26,400 lb. |
| Bues | All vehicles designed to carry more than nine passengers |
| Motorcycles | All vehicles with two or three tires and an open-air driver/passenger compartment |

| Time (s) | L | Existing Level (dBA) | Total Level (dBA) |
|---|---|---|---|
| 0 | 78 | 60 | 78.1 |
| 1 | 73.7 | 60 | 73.9 |
| 2 | 69.1 | 60 | 69.6 |
| 3 | 65.9 | 60 | 66.9 |
| 4 | 63.5 | 60 | 65.1 |
| 5 | 61.7 | 60 | 63.9 |
| 6 | 60.1 | 60 | 63.1 |
| 7 | 58.8 | 60 | 62.4 |
| 8 | 57.6 | 60 | 62 |
| 9 | 56.6 | 60 | 61.6 |
| 10 | 55.7 | 60 | 61.4 |
| 11 | 54.9 | 60 | 61.2 |
| 12 | 54.1 | 60 | 61 |
| 13 | 53.4 | 60 | 60.9 |
| 14 | 52.8 | 60 | 60.8 |
| 15 | 52.2 | 60 | 60.7 |
| 16 | 51.6 | 60 | 60.6 |
| 17 | 51.1 | 60 | 60.5 |
| 18 | 50.6 | 60 | 60.5 |
| 19 | 50.2 | 60 | 60.4 |
| 20 | 49.7 | 60 | 60.4 |
| 21 | 49.3 | 60 | 60.4 |
| 22 | 48.9 | 60 | 60.3 |
| 23 | 48.5 | 60 | 60.3 |
| 24 | 48.1 | 60 | 60.3 |
| 25 | 47.8 | 60 | 60.3 |
| 26 | 47.4 | 60 | 60.2 |
| 27 | 47.1 | 60 | 60.2 |
| 28 | 46.8 | 60 | 60.2 |
| 29 | 46.5 | 60 | 60.2 |
| 30 | 46.2 | 60 | 60.2 |

DYNAMIC ROAD TRAFFIC NOISE MAPPING USING DISTRIBUTED FIBER OPTIC SENSING (DFOS) OVER TELECOM NETWORK

CROSS REFERENCE

This application claims the benefit of U.S. Provisional Patent Application Ser. No. 63/270,645 filed 22 Oct. 2021, the entire contents of which being incorporated by reference as if set forth at length herein.

TECHNICAL FIELD

This disclosure relates generally to distributed fiber optic sensing (DFOS) systems, methods, and structures. More particularly it discloses dynamic road traffic noise mapping using DOFS over telecom network.

BACKGROUND

As is known by those skilled in the art, road traffic noise modeling is an effective tool for predicting noise levels, noise impacts, and the potential benefits of noise abatement and control for city planners. Accordingly, there have been numerous traffic noise models adopted in recent years in different countries.

For example, a Federal Highway Administration Traffic Noise model developed in the United States computes a predicted noise level through a series of adjustments to the vehicle noise emission level. An ASJ RTN-Model 2008 developed in Japan computes sound pressure levels based on the vehicle speed and changes in noise generated due to pavement type, road gradient, and noise directivity.

To compute a noise level for a vehicle type traveling along a specific roadway segment, a model needs to determine the vehicle type, volume, and speed. However, current noise models assume a constant speed for the noise level prediction and are therefore unable to predict to noise level real-time. Furthermore, most current noise prediction models are unable to account for atmospheric effects such as varying wind speed, and neutral atmospheric conditions are used instead. For example, the Federal Highway Administration Traffic Noise model uses either a speed entered by a user, a traffic control device's speed constraint, or an exit speed of a previous elemental roadway segment and assumes neutral atmospheric conditions.

SUMMARY

The above problem is solved and an advance in the art is made according to aspects of the present disclosure directed dynamic road traffic noise mapping using DFOS over a telecommunications network.

In sharp contrast to the prior art, dynamic road traffic noise mapping using DFOS over a telecommunications network according to the present disclosure enables mapping of road traffic-induced noise at any observer location. As noted, systems and methods according to the present disclosure utilize DFOS to obtain instant traffic data including vehicle speed, volume, and vehicle types, based on vibration and acoustic signal along the length of a sensing fiber along with location information. Our inventive system and method determine a sound pressure level at a point of interest, and traffic data associated with such point is incorporated into a reference noise emission database and a wave propagation theory for total sound pressure level prediction and mapping. Additionally, our inventive system and method obtain real-time wind speed using DFOS such as distributed acoustic sensing (DAS) to provide sound pressure adjustment due to the wind speed.

BRIEF DESCRIPTION OF THE DRAWING

A more complete understanding of the present disclosure may be realized by reference to the accompanying drawing in which.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator.

As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

Figure 1:
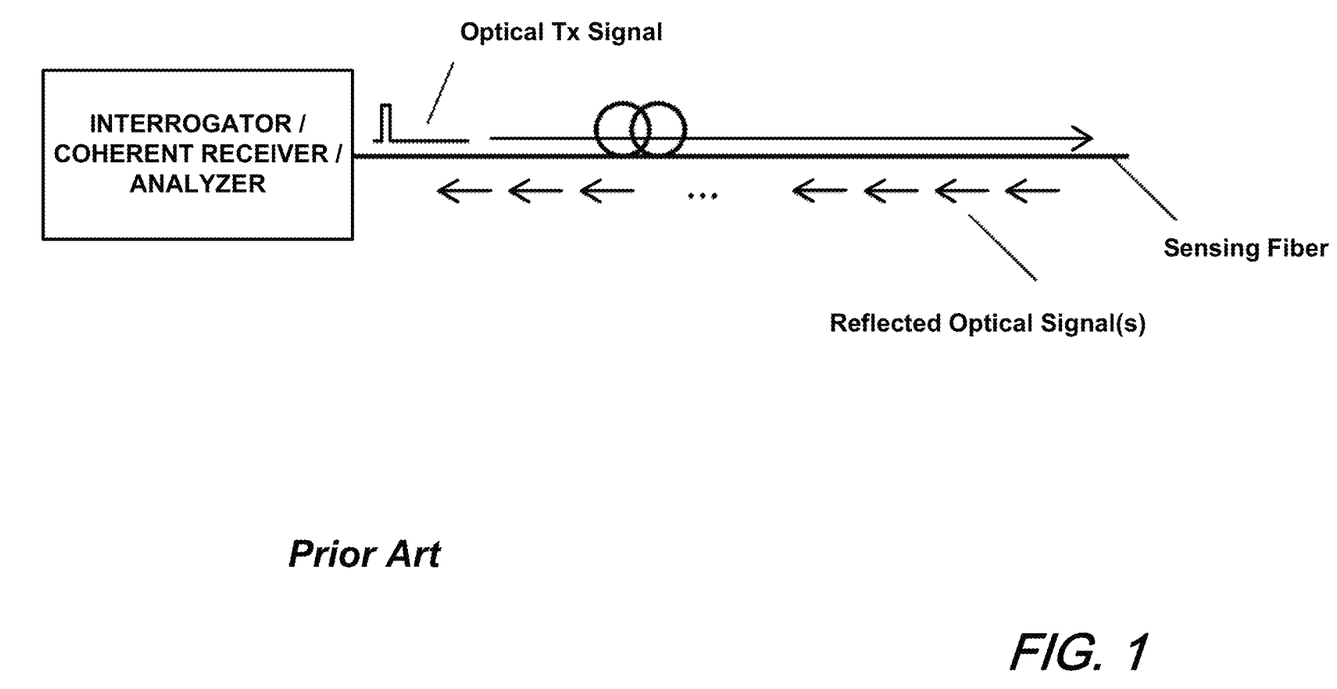
FIG. 1 is a schematic diagram illustrating a DFOS system known in the art.

FIG. 1 is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. As will be understood and appreciated, the interrogator may include a coded DFOS system that may employ a coherent receiver arrangement known in the art.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber that may be part of a larger, multi-fiber cable.

Operationally, we assume that the DFOS system will be Rayleigh-scattering based system (e.g., distributed acoustic sensing or DAS) and Brillouin-scattering based system (e.g., Brillouin optical time domain reflectometry or BOTDR) with a coding implementation. With such coding designs, these systems will be most likely be integrated with fiber communication systems due to their lower power operation and will also be more affected by the optical amplifier response time.

As previously noted, distributed fiber optic sensing (DFOS) technologies have been widely studied and developed for decades, due to their ability to monitor environmental variables (such as temperature, strain, vibration, acoustic, etc.) with long sensing distance and high accuracy. Of particular interest, Rayleigh-based DFOS have been used in a wide range of applications, including the distributed acoustic sensing (DAS), distributed vibration sensing (DVS), and the distributed temperature/strain sensing (DTSS).

As noted, dynamic road traffic noise mapping using DFOS over a telecommunications network according to the present disclosure enables mapping of road traffic-induced noise at any observer location. As noted, systems and methods according to the present disclosure utilize DFOS to obtain instant traffic data including vehicle speed, volume, and vehicle types, based on vibration and acoustic signal along the length of a sensing fiber along with location information. Our inventive system and method determine a sound pressure level at a point of interest, and traffic data associated with such point is incorporated into a reference noise emission database and a wave propagation theory for total sound pressure level prediction and mapping. Additionally, our inventive system and method obtain real-time wind speed using DFOS such as distributed acoustic sensing (DAS) to provide sound pressure adjustment due to the wind speed.

As we shall describe, our inventive systems and method instantaneously measures traffic data using distributed fiber optical sensing. Real-time vehicle speed, volume, and vehicle types is obtained directly from distributed fiber optic sensing including a distributed vibration sensor (DVS), so neither predicted traffic data nor onsite in-person traffic data is required. As will be understood and appreciated by those skilled in the art, real-time, accurate traffic data improves noise mapping accuracy due to traffic being a major source of noise generation.

To compensate for the sound pressure level due to wind, our inventive system and method employs sound pressure level adjustments for wind speed obtained from DFOS. Real-time wind speeds are fed into existing empirical equations derived from experiments on the effect of wind in propagation around a point source.

Importantly, our inventive system and method maps traffic noise levels in real-time based on an existing noise emission level database or user-defined noise emission level database. When a background noise level is available, noise mapping can be extended to overall sound pressure level including other noise sources.

Figure 2:
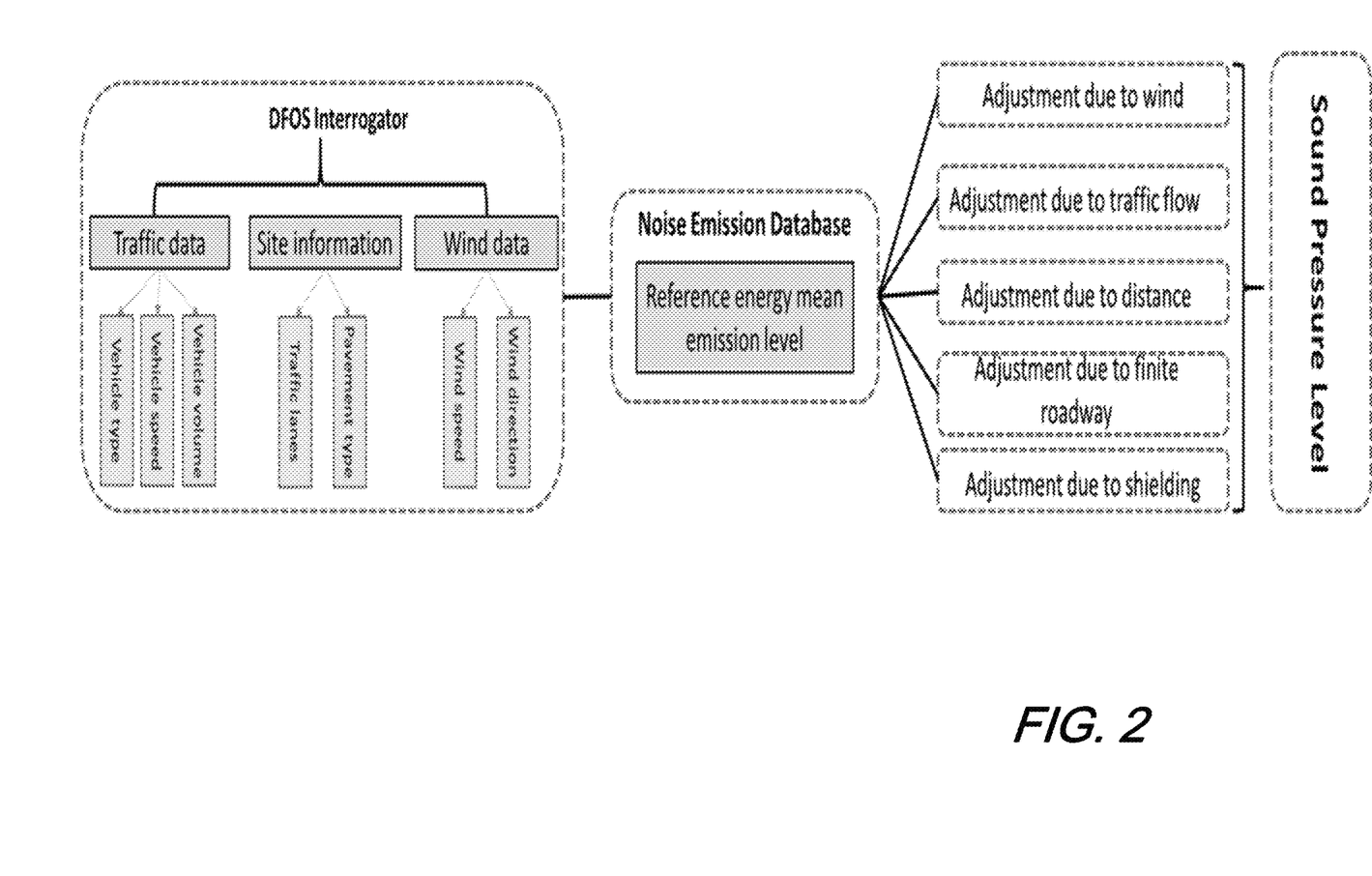
FIG. 2 is a schematic diagram showing illustrative road traffic noise mapping based on real-time traffic data from DFOS according to aspects of the present disclosure.

FIG. 2 is a schematic diagram showing illustrative road traffic noise mapping based on real-time traffic data from DFOS according to aspects of the present disclosure.

As we shall now show and describe, there are several steps/operations associated with our inventive systems and methods including: 1) Vehicle Classification; 2) Determining Reference Energy Mean Emission Level(s); 3) Calculate Equivalent Sound Level Due to Various Adjustment Factors; 4) Calculate Equivalent Sound Level for a Single Vehicle; and 5) Calculate the Hourly Equivalent Sound Level of the $i^{th}$ Class of Vehicles.

Figure 3:
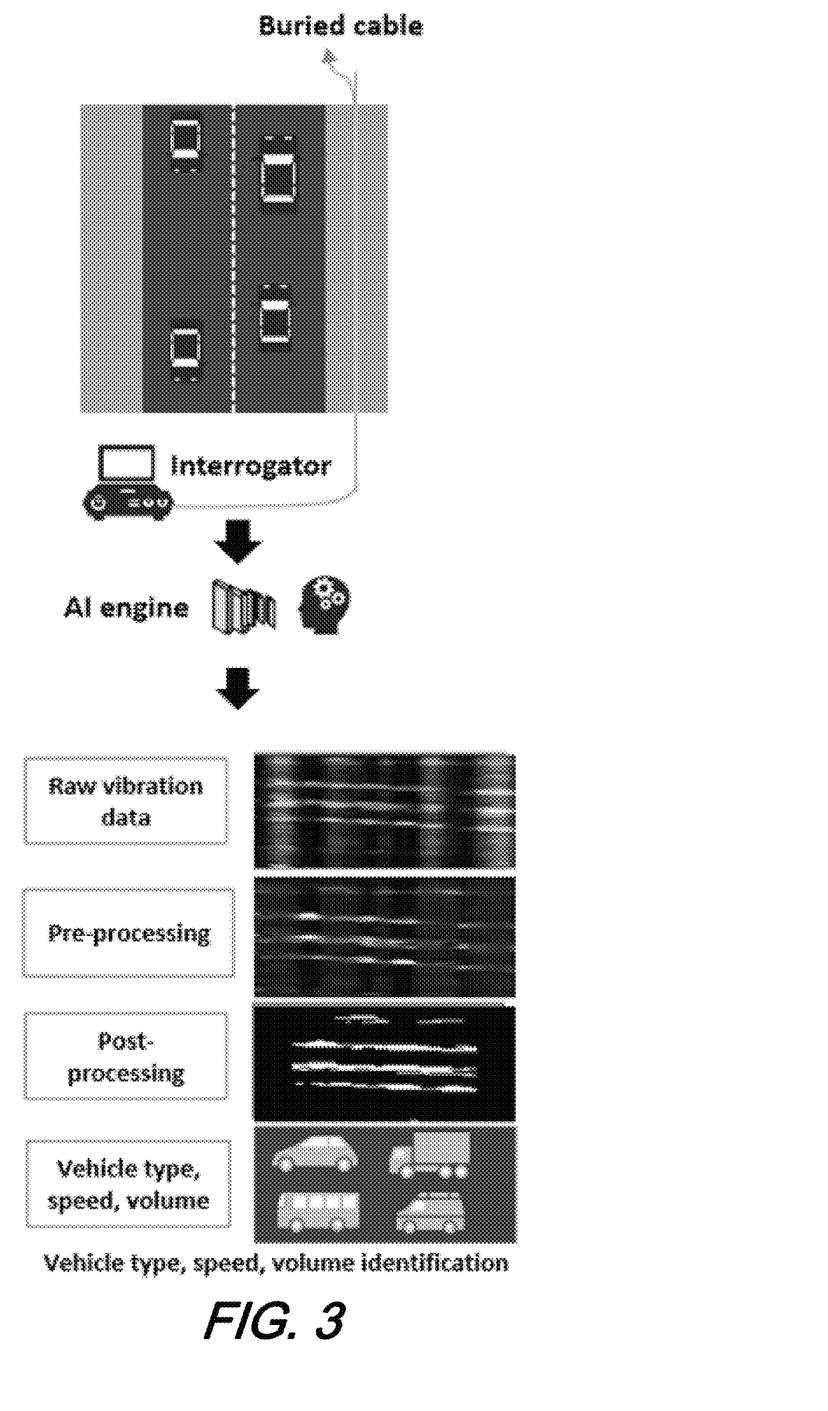
FIG. 3 is a schematic diagram showing illustrative real-time traffic data processing from DFOS according to aspects of the present disclosure.
Figure 4:
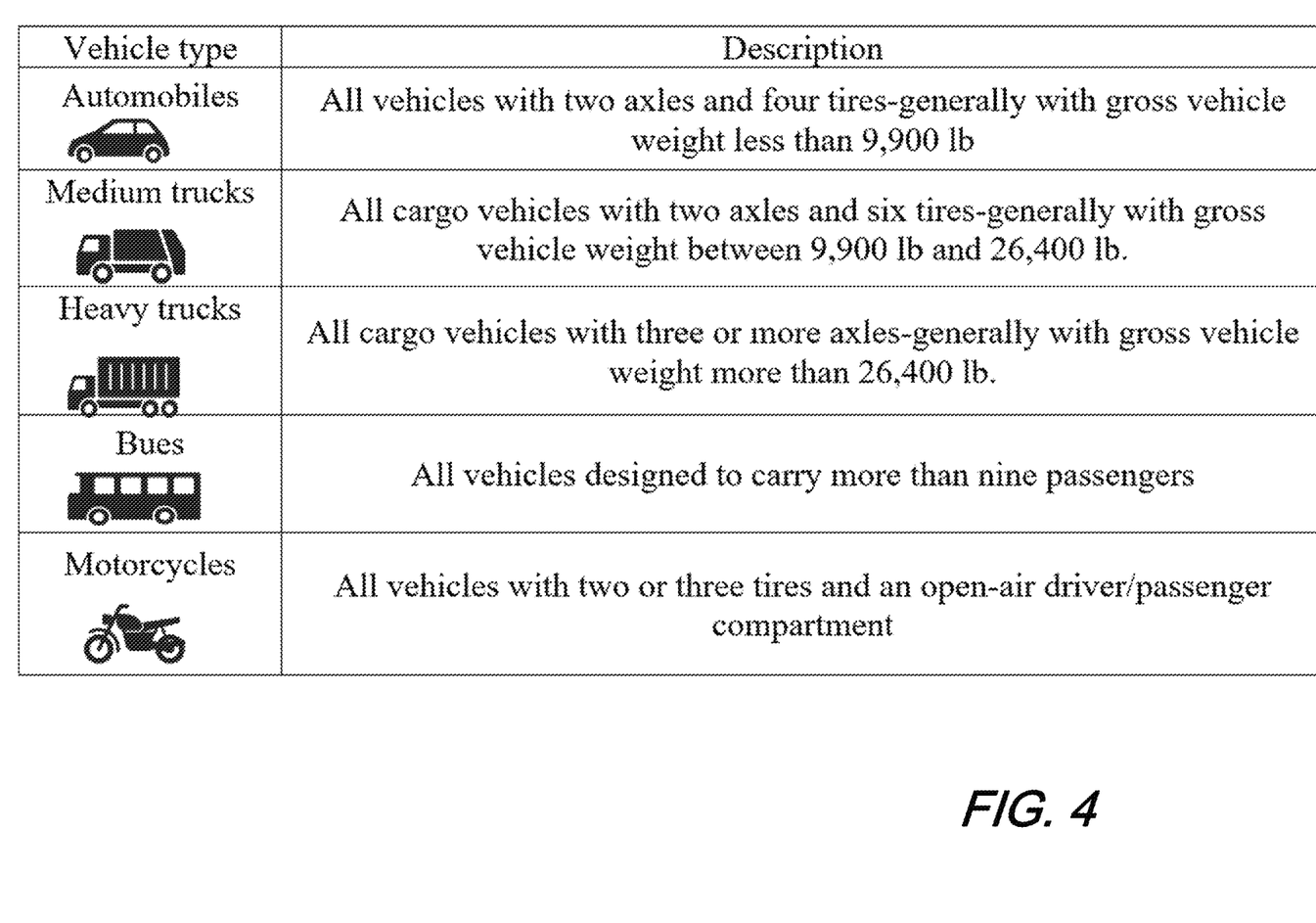
FIG. 4 shows illustrative vehicle types included in Federal Highway Administration (FHWA) documentation.

FIG. 3 is a schematic diagram showing illustrative real-time traffic data processing from DFOS according to aspects of the present disclosure; and Vehicle Classification Vehicle Classification involves a DFOS interrogator connected to an optical fiber cable route of interest. The real-time vehicle-induced raw vibration data is collected and pre-processed where it undergoes filtering, normalization, and threshold processing to denoise the raw vibration data signal. Next, it is post-processed in which the preprocessed data are further processed using morphological manipulation and filter kernels. The post-processed data is then applied to an AI engine for vehicle speed, type, and volume identification. To align with the existing FHWA noise emission level database, vehicle types included in the database are described in FIG. 4 which shows illustrative vehicle types included in Federal Highway Administration (FHWA) documentation.

Determine Reference Energy Mean Emission Levels

Noise emission levels at a reference distance (50 ft) from a source as a function of vehicle speed, type, throttle, and pavement type are determined according to the following relationships:

$$E_A(s_i) = (0.6214 s_i)^{\frac{A}{10}} \times 10^{B/10} + 10^{C/10} \quad (1)$$

$$L_A(s_i) = 10\log_{10}(E_a(s_i)) \quad (2)$$

$$L_{emis,i}(s_i, f) = L_A(s_i) + (D_1 + 0.6214 D_2 s_i) + \quad (3)$$
$$(E_1 + 0.6214 E_2 s_i)[\log_{10}(f)] + (F_1 + 0.6214 F_2 s_i)[\log_{10}(f)]^2 +$$
$$(G_1 + 0.6214 G_2 s_i)[\log_{10}(f)]^3 + (H_1 + 0.6214 H_2 s_i)[\log_{10}(f)]^4 +$$
$$(I_1 + 0.6214 I_2 s_i)[\log_{10}(f)]^5 + (J_1 + 0.6214 J_2 s_i)[\log_{10}(f)]^6$$

Where, $E_A$ is the maximum noise emission energy for a vehicle pass by, $s_i$ is vehicle speed in km/h for the ith vehicle and A to $J_2$ are variables that depend on vehicle type, pavement type, and engine throttle and can be found in FHWA TNM 3.0. Table 10, which is incorporated herein by reference. $L_A(s_i)$ is the level equivalent.

The FHWA TNM database includes noise emission levels for vehicles on four pavement types. They are Dense-graded asphalt concrete (DGAC), Portland cement concrete (PCC), Open-graded asphaltic concrete (OGAC), and an "Average" composite pavement type including data for DGAC and PCC combined.

Figure 5:
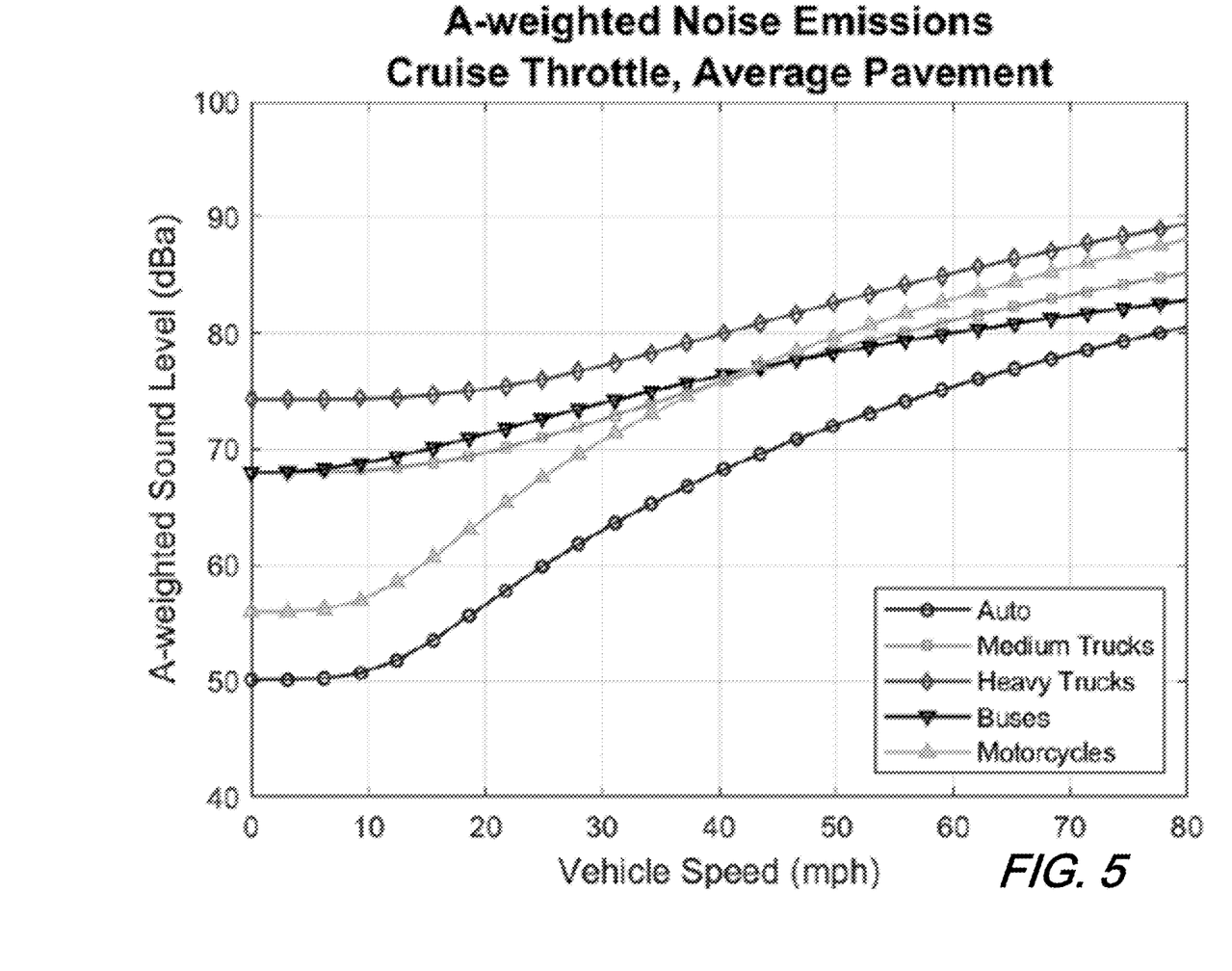
FIG. 5 is a plot showing A weighted vehicle noise emission levels under cruise conditions from FHWA documentation.

FIG. 5 is a plot showing overall A-weighted emission levels as a function of speed for all vehicle types under cruise conditions traveling on "Average" pavement. The complete set of emission level curves for all vehicle types under all conditions is given in FHWA.

Calculate Equivalent Sound Level Due to Various Adjustment Factors

Adjustment Due to Wind

The change in sound pressure level because of wind $\Delta_w$ for a straight road can be estimated from the following equation:

$$\Delta_w = \begin{cases} 0.88 lg\left(\frac{l}{15}\right) \cdot U_{vec} & l > 15 \\ 0 & l \ll 15 \end{cases}$$

Where l is the distance from the centerline of a roadway to an observer/prediction point, $U_{vec} = U \cos\theta$ is the vector component of the average wind speed U for angle θ between the wind direction and a line perpendicular to the road through the observer location. Advantageously, both U and wind direction can be obtained from DFOS such as from the cable mounted on utility poles.

Adjustment Due to Traffic Flow

The instantaneous and equivalent sound pressure levels were derived for a single point source vehicle traveling at a constant speed V obtained from DFOS. The single-vehicle model must be adjusted due to various factors such as wind, traffic flow, shielding, etc. to be capable of addressing real sound pressure levels.

Calculate Equivalent Sound Level for a Single Vehicle

Figure 6:
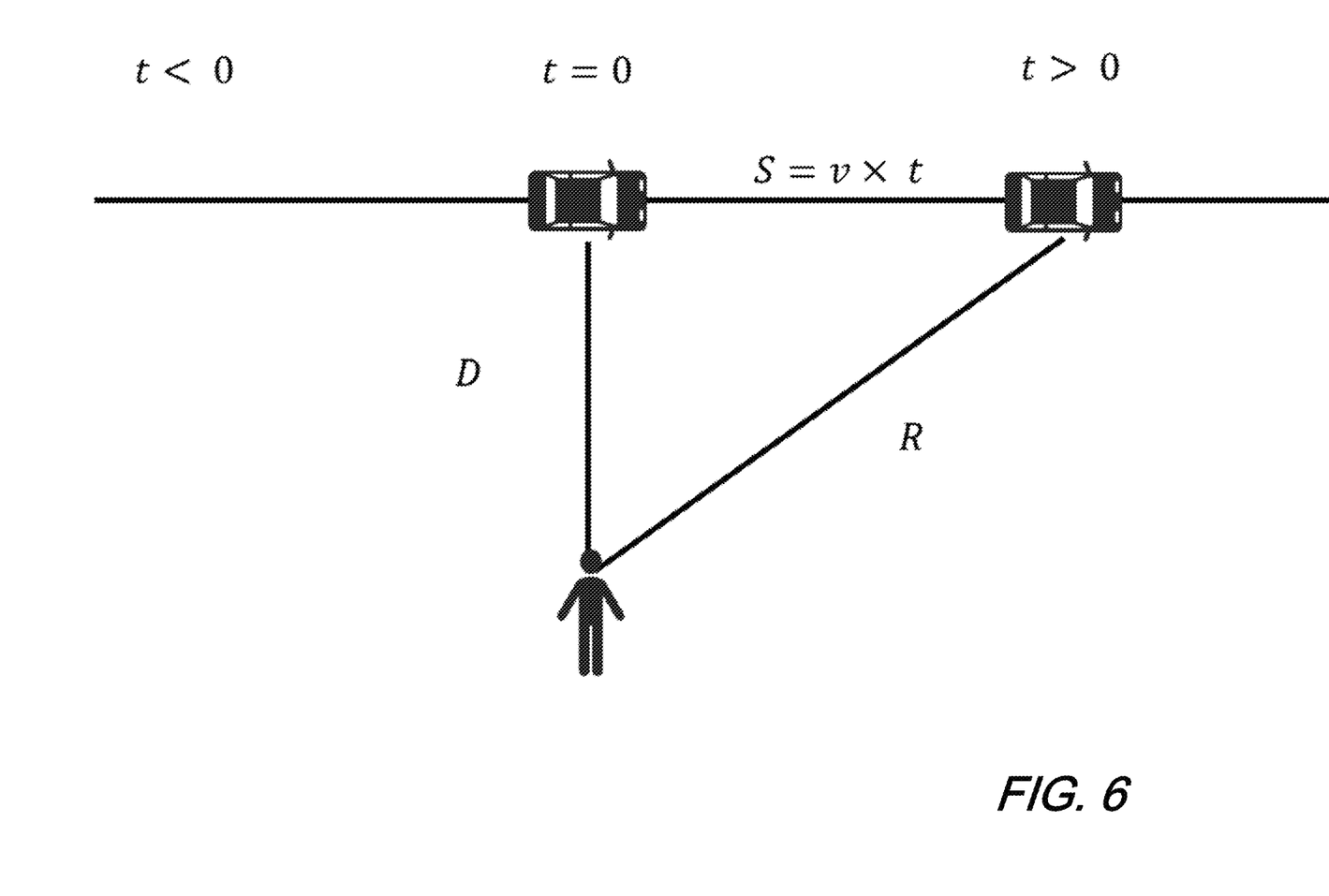
FIG. 6 is a schematic diagram showing illustrative plan view relationship between observer and vehicle according to aspects of the present disclosure.

Consider a single vehicle traveling with constant speed y, past an observer located next to a straight, flat, infinitely long, single lane as shown in FIG. 6, which is a schematic diagram showing illustrative plan view relationship between observer and vehicle according to aspects of the present disclosure.

In this illustration, D is the perpendicular distance from the observer to the centerline of the roadway. R is the distance between the observer and the vehicle after travel time t, travel distance of S, which varies with time. Thus, the distance between the observer and the vehicle is given by:

$$R = \sqrt{D^2 + (vt)^2}.$$

Since the observer is sufficiently far from the vehicle, the vehicle can be considered as an acoustic point source. The relationship between the mean square sound pressure, $P^2$, at distance R, and the reference mean square pressure, $P_0^2$, radiated by the point source vehicle at some reference distance $D_0$ is given by:

$$P^2 = P_0^2 \frac{D_0^2}{R^2} = P_0^2 \frac{D_0^2}{D^2 + (vt)^2}.$$

To ensure the validity of the point sound source, the reference distance should not be less than 15 meters, therefore the minimum observer distance D should also be 15 meters. Based on the time-dependent sound pressure level (L) equation:

$$L = 10\log\frac{P^2}{P_{ref}^2} \quad (dB)$$

where $P_{ref}^2 = 2 \times 10^{-5}$ Pa.

Applying the above equation to the mean square pressure radiated by a point source vehicle $$L = 10\log\frac{P^2}{P_{ref}^2} = 10\log\left[\frac{P_0^2}{P_{ref}^2}\frac{D_0^2}{D^2 + (vt)^2}\right]$$

Since log(AB)=log(A)+log(B), the above equation can be changed to:

$$L = 10\log\frac{P_0^2}{P_{ref}^2} + 10\log\frac{D_0^2}{D^2 + (vt)^2}$$

and can be further written as:

$$L = L_0 + 10\log\frac{D_0^2}{D^2 + (vt)^2}$$

where $L_0$ is the noise emission level of the vehicle at a distance $D_0^2$.

Thus, the sound pressure level L at distance D will depend on vehicle type and speed, and since $R^2 = D^2 + (vt)^2$, the sound level for a single vehicle is given by:

$$L = L_0 + 10\log\frac{1}{R^2}$$

Example 1: Suppose the vehicle class and speed obtained from DVS are automobile and 70 km/h, traveling on "Average" pavement. Investigate the time history of the sound level between t=−30 s and t=30 s for an observer located 15 m from the centerline of the roadway with an existing sound level of 60 dBA.

Figure 7:
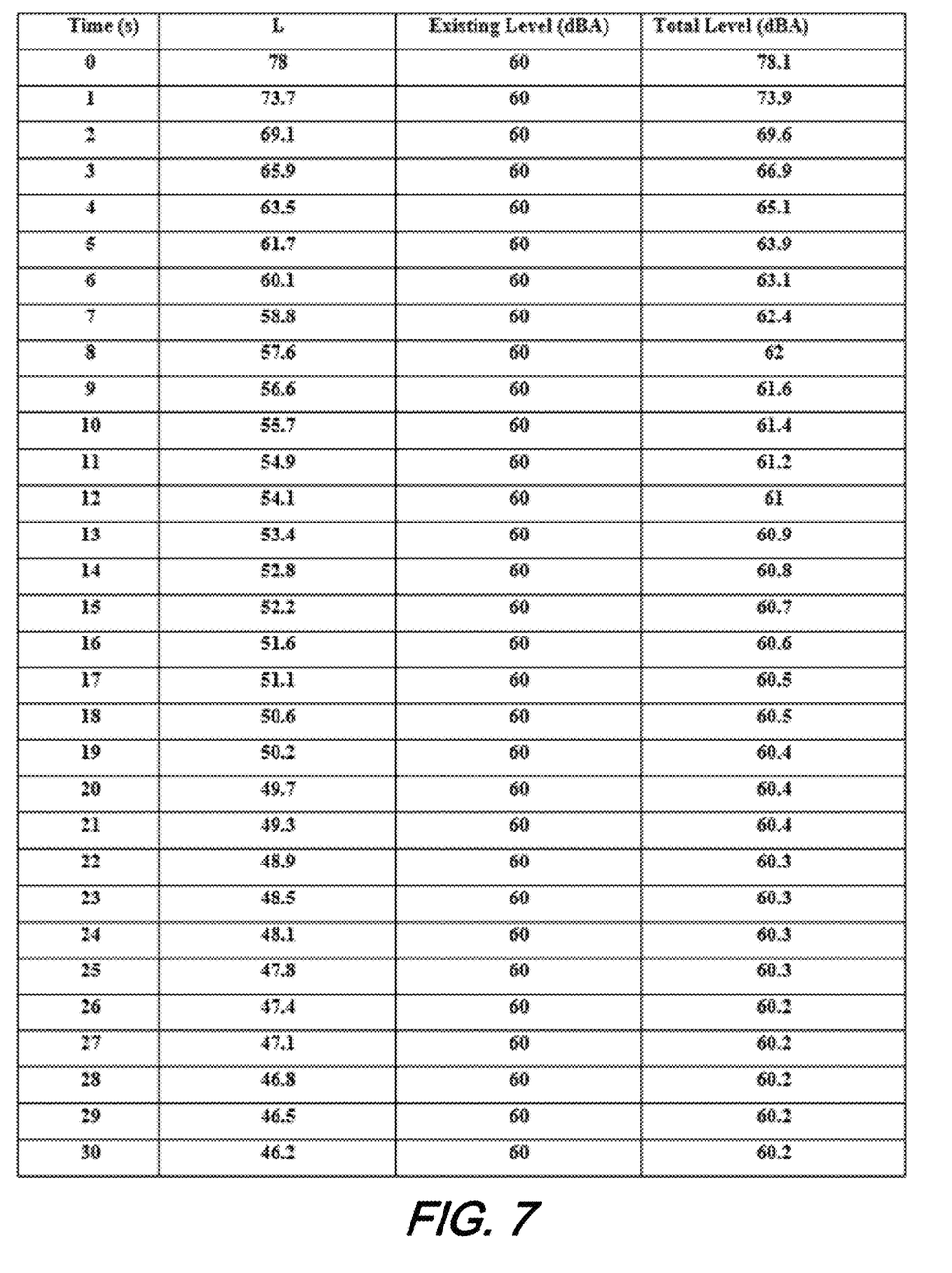
FIG. 7 shows instantaneous sound pressure levels according to aspects of the present disclosure.

The overall A-weighted emission levels for an automobile traveling at 70 km/h under cruise conditions traveling on "Average" pavement is 78 dBA as shown in FIG. 3 is $$L = L_0 + 10\log\frac{15^2}{15^2 + (19.4t)^2} =$$
$$78 + 10\log 15^2 - 10\log[15^2 + (19.4t)^2] = 101.5 - 10\log[15^2 + (19.4t)^2]$$

and FIG. 7 shows instantaneous sound pressure levels according to aspects of the present disclosure.

Figure 8:
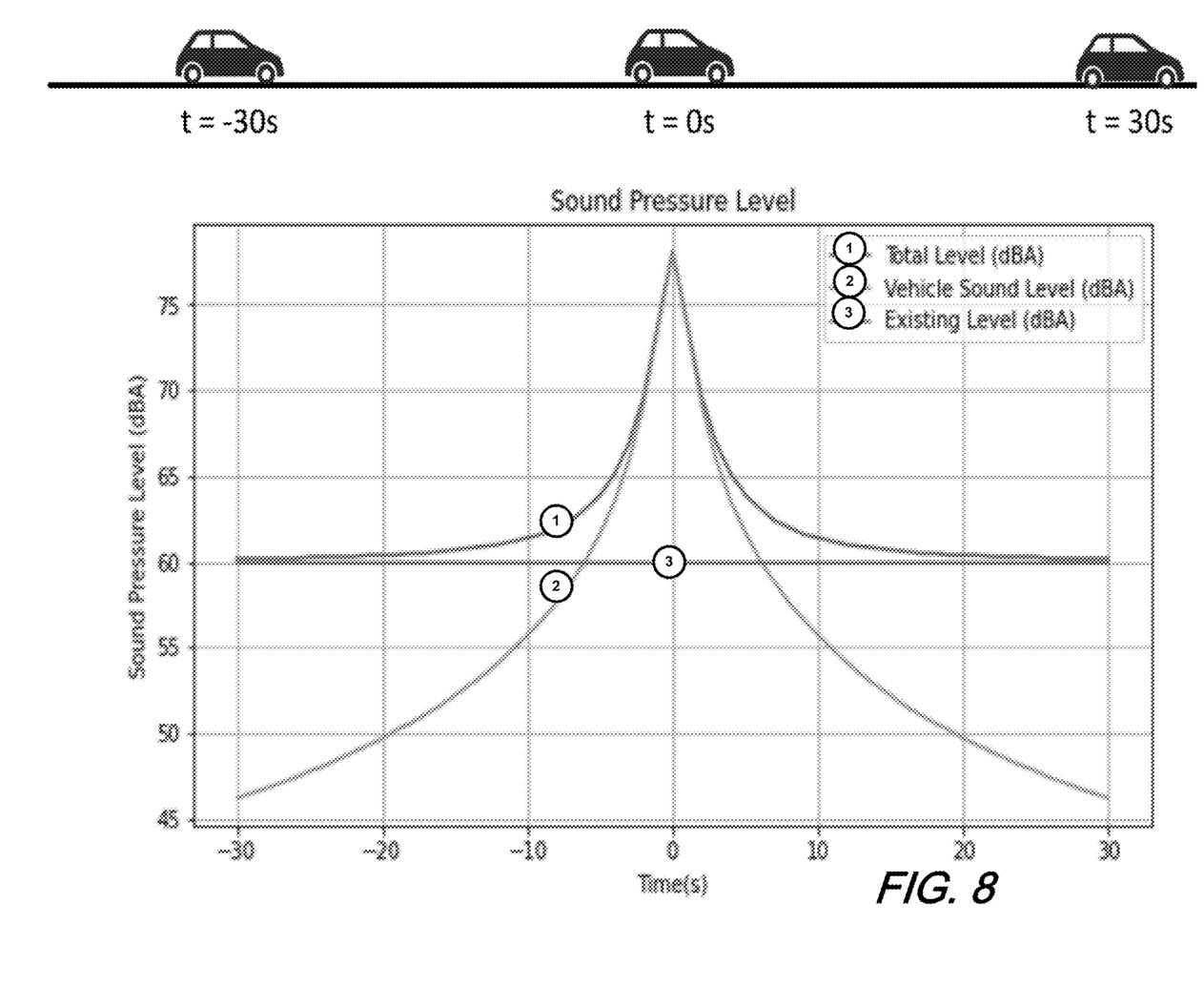
FIG. 8 is a plot showing illustrative sound pressure level experienced by an observer 15 m from a centerline of a roadway according to aspects of the present disclosure.

FIG. 8 is a plot showing illustrative sound pressure level experienced by an observer 15 m from a centerline of a roadway according to aspects of the present disclosure. FIG. 8 presents the results of Example 1, which shows that the presence of the existing sound level can significantly change the sound envelop of the passing vehicle.

Suppose the vehicle speeds are identical for each of the $i^{th}$ types of N vehicles passing the observer. The sound pressure level due to the adjustment due to traffic flow can be calculated from the following equation:

$$\Delta_T = 10\log\frac{N_i\pi D_0}{TV_i}$$

Adjustment Due to Distance

Sound level due to adjustment of distance is presented below, where a is a constant site parameter whose values depend upon site conditions. For example, when the site is reflective, α=0, while if the site is absorptive, α=0.5.

$$\Delta_D = 10\log\left(\frac{D_0}{D}\right)^{1+\alpha}$$

Adjustment Due to a Finite Roadway

At a soft site, the adjustment to the equivalent sound pressure level for a roadway segment is defined by the angles ($\emptyset_k$, $\emptyset_2$) is $$\Delta_s = 10\log\frac{1}{\pi}\int_{\emptyset_1}^{\emptyset_2}\sqrt{\cos\emptyset}\,d\emptyset$$

Adjustment Due to Shielding

Shielding adjustment $\Delta_s$ is the attenuation, in dB, provided by some type of shielding such as noise barriers, rows of houses, densely wooded areas, etc.

Step 5. Calculate the Hourly Equivalent Sound Level of the $i^{th}$ Class of Vehicles $$L_{eq}(h)_i = (L_0)_{E_i} + \Delta_T + \Delta_D + \Delta_s$$

Where $(L_0)_{E_i}$ is the reference energy mean emission level of the $i^{th}$ class of vehicle.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for dynamic road traffic noise mapping over a telecommunications network using distributed fiber optic sensing (DFOS) comprising:
   providing a DFOS system including:
      a length of optical sensor fiber; and
      a DFOS interrogator and analyzer having an AI engine, the DFOS interrogator configured to generate optical pulses from laser light, introduce the pulses into the optical fiber and detect/receive reflected signals from the optical fiber;
   operating the DFOS system to obtain roadway instantaneous vehicle traffic data at a plurality of points along the optical fiber based on vibration and acoustic information determined from the reflected signals from the optical fiber, said instantaneous vehicle traffic data including location along the optical fiber, vehicle speed, vehicle types, and vehicle traffic volume; and
   determining a sound pressure level at a point of interest along the optical fiber from the vehicle traffic data.

2. The method of claim 1 further comprising determining a real-time wind speed from DFOS reflected signals from the optical fiber and adjusting the determined sound pressure level due to wind speed.

3. The method of claim 2 wherein the reflected signals from the optical fiber are distributed vibration sensing (DVS) signals and the instantaneous vehicle traffic data is determined by distributed vibration sensing (DVS) data generated from the DVS signals.

4. The method of claim 3 wherein DVS data is filtered, normalized, and threshold processed to denoise the DVS data and then applied to the AI engine for determination of the instantaneous vehicle traffic data including vehicle speed, vehicle types, and vehicle traffic volume.

5. The method of claim 4 wherein the determined vehicle types include automobiles, medium trucks, heavy trucks, buses, and motorcycles.

6. The method of claim 5 further comprising determining noise emission level of road traffic noise at a reference distance, said noise emission level determined from vehicle speed, vehicle type, vehicle throttle level, and pavement type at a location along the optical fiber.

7. The method of claim 6 further comprising determining an equivalent sound pressure level due to wind $\Delta_w$ according to the following equation:

$$\Delta_w = \begin{cases} 0.88 lg\left(\frac{l}{15}\right)\cdot U_{vec} & l > 15 \\ 0 & l \ll 15 \end{cases}$$

Where l is the distance from the centerline of a roadway to an observer/prediction point, $U_{vec}=U\cos\theta$ is the vector component of the average wind speed U for angle θ between a wind direction and a line perpendicular to the roadway through the observer location.

8. The method of claim 6 further comprising determining an equivalent sound pressure for a single vehicle.

9. The method of claim 8 further comprising determining a sound pressure adjustment due to distance between an observer/prediction point to a centerline of the roadway using site conditions including site reflectivity and site absorptivity.

10. The method of claim 9 further comprising determining a shielding adjustment to the sound pressure wherein the shielding adjustment $\Delta_s$ is an attenuation, in dB, provided by some type of shielding such as noise barriers, buildings, and vegitation.

* * * * *